(12) United States Patent  
Wheeler (10) Patent No.: US 8,505,678 B2
(45) Date of Patent: Aug. 13, 2013

(54) FLUID TRANSFER PIPE AND FLUID TRANSFER APPARATUS AND A FLUID ATTENUATOR AND ATTENUATOR APPARATUS

(75) Inventor: Russell Wheeler, Hampshire (GB)

(73) Assignee: Russell Wheeler, Southampton (GB)

( * ) Notice: Subject to any disclaimer, the term of this patent is extended or adjusted under 35 U.S.C. 154(b) by 0 days.

(21) Appl. No.: 13/254,819

(22) PCT Filed: Mar. 1, 2010

(86) PCT No.: PCT/GB2010/050350
§ 371 (c)(1),
(2), (4) Date: Nov. 21, 2011

(87) PCT Pub. No.: WO2010/100474
PCT Pub. Date: Sep. 10, 2010

(65) Prior Publication Data
US 2012/0055733 A1    Mar. 8, 2012

(30) Foreign Application Priority Data
Mar. 2, 2009  (GB) .................................. 0903554.4

(51) Int. Cl.
*F01N 5/00* (2006.01)
(52) U.S. Cl.
USPC .......................................... 181/212; 181/228
(58) Field of Classification Search
USPC ................................................ 181/212, 228
See application file for complete search history.

(56) References Cited

U.S. PATENT DOCUMENTS

| 2,247,130 | A | 6/1941 | McCurdy | |
| 4,533,015 | A | 8/1985 | Kojima | |
| 5,248,859 | A | 9/1993 | Borla | |
| 5,449,866 | A * | 9/1995 | Moss | 181/228 |
| 5,828,013 | A | 10/1998 | Wagner et al. | |
| 6,382,348 | B1 | 5/2002 | Chen | |
| 6,385,967 | B1 * | 5/2002 | Chen | 60/312 |
| 6,640,927 | B1 * | 11/2003 | Turner | 181/252 |
| 6,799,657 | B2 * | 10/2004 | Daniels | 181/252 |
| 6,868,939 | B2 * | 3/2005 | Ziehl | 181/256 |
| 6,935,461 | B2 * | 8/2005 | Marocco | 181/270 |
| 7,510,050 | B2 * | 3/2009 | Emler | 181/249 |
| 2010/0224159 | A1 * | 9/2010 | Prior | 123/184.53 |
| 2011/0005857 | A1 * | 1/2011 | Pommerer et al. | 181/212 |

FOREIGN PATENT DOCUMENTS

| FR | 2876172 A1 | 4/2006 |
| GB | 215625 A | 5/1924 |
| GB | 968347 A | 9/1964 |
| JP | 9177539 A | 7/1997 |
| WO | WO03/056228 A1 | 7/2003 |
| WO | WO03056223 A2 | 7/2003 |
| WO | WO2006098694 A1 | 9/2006 |

* cited by examiner

*Primary Examiner* — Forrest M Phillips
(74) *Attorney, Agent, or Firm* — Lee & Hayes, PLLC

(57) ABSTRACT

A fluid transfer pipe (1) comprising opposed ends (3, 5) adapted to be connected to respective pipework, the pipe (1) comprising a longitudinal axis (9), the transverse cross section of the pipe (1) varying along the length of the pipe such that the distance radially outwardly from the longitudinal axis (9) to the inner wall of the pipe (1) is non linear along at least part of the length of the pipe. A fluid attenuator comprising such a pipe is also disclosed.

21 Claims, 7 Drawing Sheets

FLUID TRANSFER PIPE AND FLUID TRANSFER APPARATUS AND A FLUID ATTENUATOR AND ATTENUATOR APPARATUS

The present invention relates to a fluid transfer pipe and fluid transfer apparatus and a fluid attenuator and fluid attenuator apparatus.

It is desirable in fluid transfer apparatus to be able to force the fluid through fluid transfer pipes as efficiently as possible. In view of the increasing importance of reducing the energy needed to power a given apparatus, it is desirable to be able to reduce the power consumption of the motor that drives the fan or pump that forces fluid through the fluid transfer pipes. However, simply using a smaller motor, also reduces the volume flow rate of fluid through the pipes.

In a fluid sound attenuator and attenuator apparatus, such as might be used for example, in a vehicle exhaust, jet ventilation system, tunnel and car park ventilation system, or a high velocity air terminal/discharge, it is desirable to be able to attenuate the sound of fluid being transferred through the system, whilst also minimising energy consumption and maintaining the desired volume flow rate of fluid.

According to a first aspect of the invention there is provided a fluid transfer pipe comprising opposed ends adapted to be connected to respective pipework, the pipe comprising a longitudinal axis, the transverse cross section of the pipe varying along the length of the pipe such that the distance radially outwardly from the longitudinal axis to the inner wall of the pipe is non linear along at least part of the length of the pipe.

According to a second aspect of the invention there is provided a fluid attenuator comprising a pipe the opposed ends of which are adapted to be connected to respective pipework, the pipe comprising a longitudinal axis, the transverse cross section of the pipe varying along the length of the pipe such that the distance radially outwardly from the longitudinal axis to the inner wall of the pipe is non linear along at least part of the length of the pipe.

The transverse cross section of the pipe is such as to in use when fluid is flowing or forced along it, induce layers of fluid of differing flow velocities/pressures, the radially outer layer being of lower flow velocity/pressure than a radially inner layer such that the radially outer layer functions as a liquid pipe through which the radially inner layer flows.

Preferably the transverse cross section of pipe varies gradually along the length of the pipe.

Preferably the pipe is twisted about its longitudinal axis such that the transverse cross section of the pipe varies along its length, that is the pipe appears as if one part of the pipe has been rotated about the longitudinal axis relative to another longitudinal spaced part of the pipe.

The transverse cross section of the pipe may therefore be of spiral form.

The pipe thus preferably comprises two aligned opposed ends of substantially identical transverse cross section, and an intermediate portion of differing transverse cross section to the two ends.

Each opposed end of the pipe may be of quadrilateral transverse cross section. Other shapes of transverse cross section are envisaged including, pentagonal, hexagonal, octagonal and heptagonal. The ends of the pipe may, when viewed in transverse cross section, comprise a plurality of straight portions linked by respective angled portions.

Each opposed end of the pipe may be of curved transverse cross section, such as circular, oval or elliptical for example.

The pipe may be of substantially constant transverse cross section along its length but be formed with a formation or insert of varying transverse cross section. For example, a spiral channel may be formed in the wall of a circular, oval or elliptical cross section pipe.

The pipe may comprise multiple concentric pipes mounted together to form a composite pipe, the transverse cross section of at least one of the pipes varying along the length of the pipe. The transverse cross section of all of the concentric pipes may vary along the length of the pipe. The transverse cross section of one pipe may vary in a contra direction to the transverse cross section of another pipe.

The pipe may be perforated. At least one of the concentric inner pipes may also be perforated. The pipe or pipes may be perforated along part of their length only.

The pipe may be provided with an insert of sound deadening material. Such sound deadening material may be provided in a variable cross section cavity defined between adjacent concentric pipes.

The pipe may be provided with an acoustically reactive chamber operative to introduce a noise reducing resonance in the fluid passing through the chamber. Such a reactive chamber may comprise a Helmholtz Resonator comprising a narrow fluid inlet leading to a larger fluid chamber.

According to a third aspect of the invention there is provided a fluid transfer apparatus comprising a fluid transfer pipe in accordance with the first aspect of the invention.

According to a fourth aspect of the invention there is provided a method of transferring fluid using a fluid transfer pipe in accordance with the first aspect of the invention.

According to a fifth aspect of the invention there is provided a fluid attenuator apparatus comprising a fluid inlet and a fluid outlet, a fluid attenuator in accordance with the second aspect of the invention being connected between the fluid inlet and the fluid outlet.

According to a sixth aspect of the invention there is provided a method of attenuating sound generated by a flowing fluid using a fluid attenuator in accordance with the second aspect of the invention.

Other aspects of the present invention may include any combination of the features or limitations referred to herein.

The present invention may be carried into practice in various ways, but embodiments will now be described by way of example only with reference to the accompanying drawings in which:

FIGS. 4a and 4b are perspective views of two different lengths of the fluid transfer pipe/fluid attenuator of FIG. 3;

Figure 1:
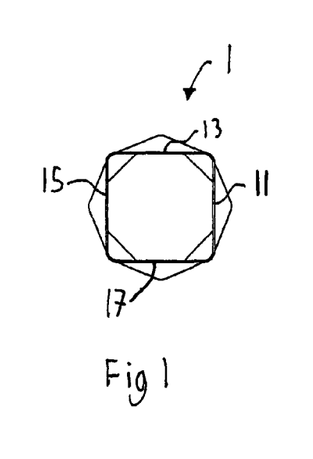
FIG. 1 is an end view of a fluid transfer pipe/fluid attenuator in accordance with the present invention.
Figure 2:
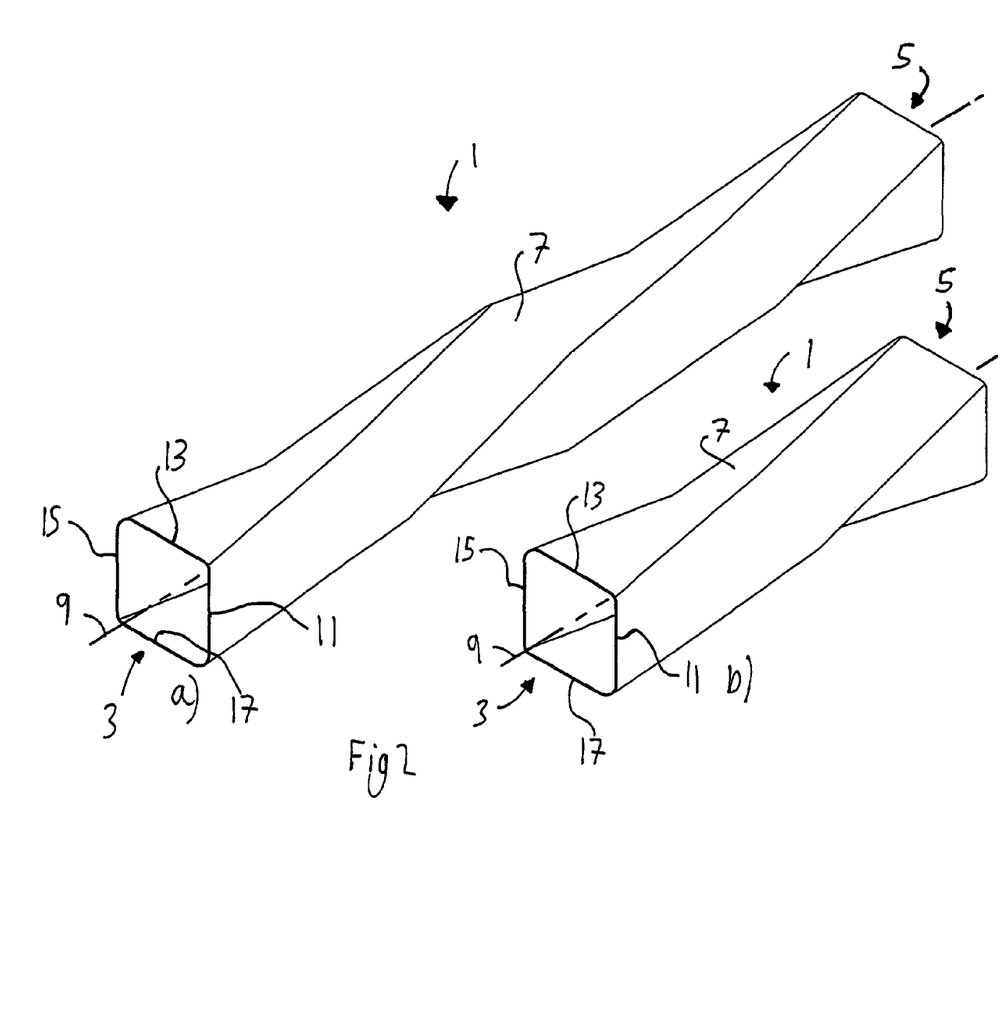
FIGS. 2a and 2b are perspective views of two different lengths of the fluid transfer pipe/fluid attenuator of FIG. 1.

Referring initially to FIGS. 1 and 2, a fluid transfer pipe/fluid attenuator 1 comprises two opposed ends 3, 5 and an intermediate variable cross section portion 7.

The ends of the fluid transfer pipe/fluid attenuator 1 in this example are of square transverse cross section, when viewed along longitudinal axis 9, such that the fluid transfer pipe/fluid attenuator 1 comprises four straight walls 11, 13, 15, 17.

In this example, the pipe 1 has been twisted along its length such that the end 5 has been rotated through 180° compared to the end 3. Thus the side wall 11 for example of end 3 comprises the opposed side wall of the end 5.

Thus, the transverse cross section of the fluid transfer pipe/fluid attenuator 1 varies along its length such that the distance from the longitudinal axis 9 radially outwardly to the inner surface of the fluid transfer pipe/fluid attenuator 1 is non linear along at least part of the length of the fluid transfer pipe/fluid attenuator 1.

Referring to FIG. 2b, a similar fluid transfer pipe/fluid attenuator 1 is shown having been twisted through only 90° along its length.

Figures 3, 4:
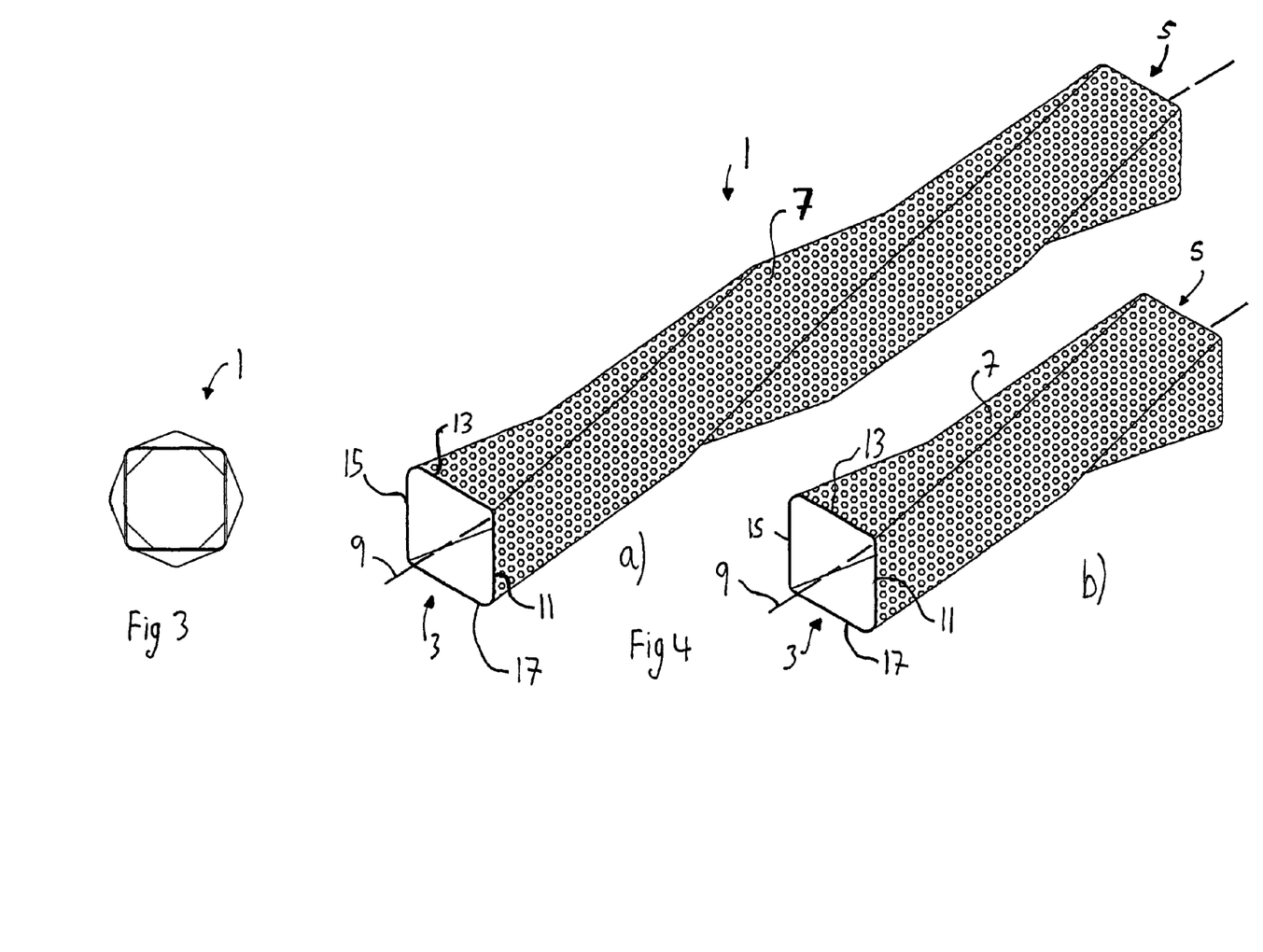
FIG. 3 is an end view of another fluid transfer pipe/fluid attenuator in accordance with the present invention.

Referring to FIGS. 3 and 4, an identical shape fluid transfer pipe/fluid attenuator 1 is shown but having perforated walls.

Figure 5:
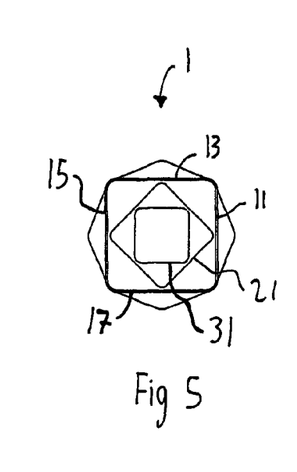
FIG. 5 is an end view of a further fluid transfer pipe/fluid attenuator in accordance with the present invention.
Figure 6:
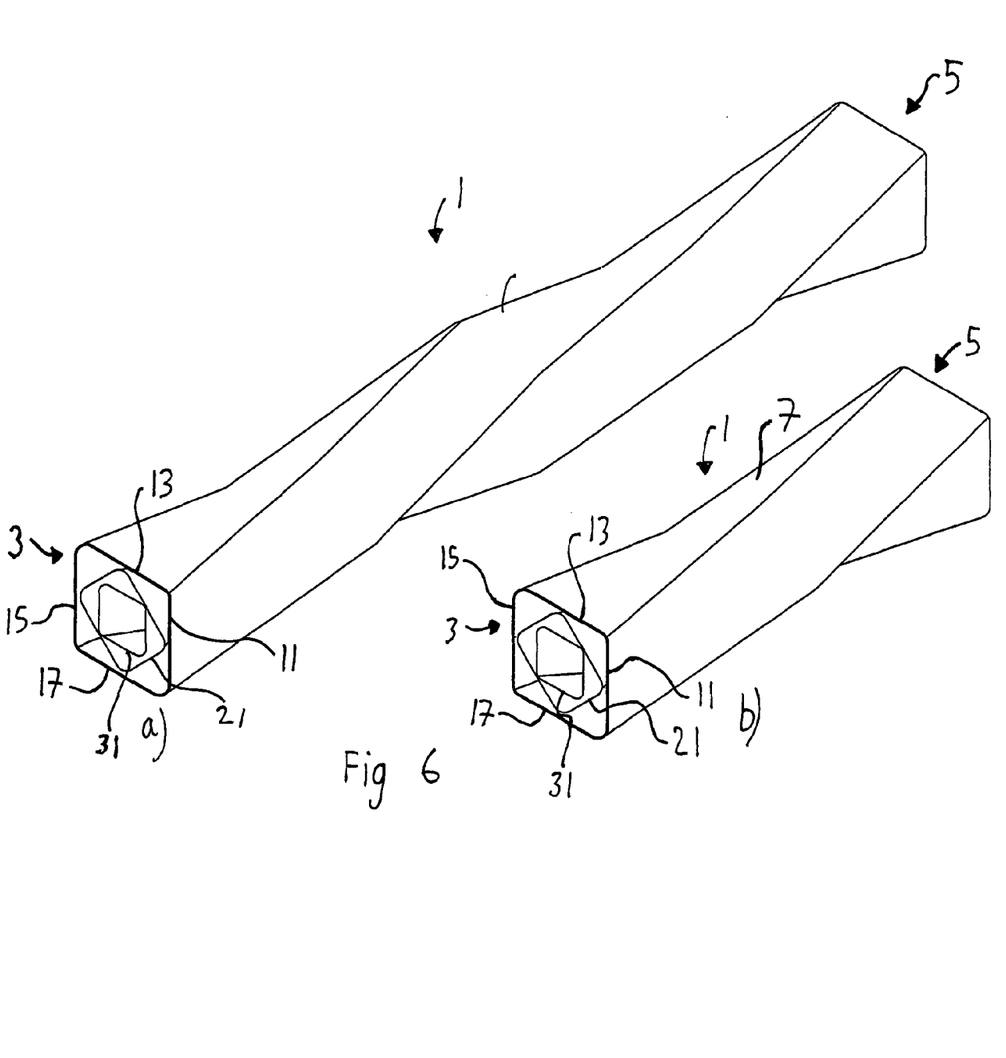
FIGS. 6a and 6b are perspective views of two different lengths of the fluid transfer pipe/fluid attenuator of FIG. 5.

Referring to FIGS. 5 and 6, another embodiment of a fluid transfer pipe/fluid attenuator 1 is shown with like features being given like references.

In this embodiment, two inner pipes 21, 31 are mounted concentrically within the pipe 1, the inner pipes each being of square transverse cross section that is uniform along their length. The pipes 1, 21, 23 define three radially spaced transfer ducts 25, 27, 29. These ducts 25, 27, 29 can be used for fluid transfer or may be filled with inserts of sound deadening material.

Figure 7:
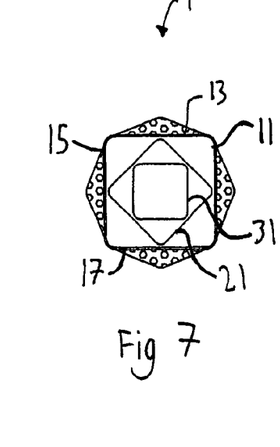
FIG. 7 is an end view of a yet further fluid transfer pipe/fluid attenuator in accordance with the present invention.
Figure 8:
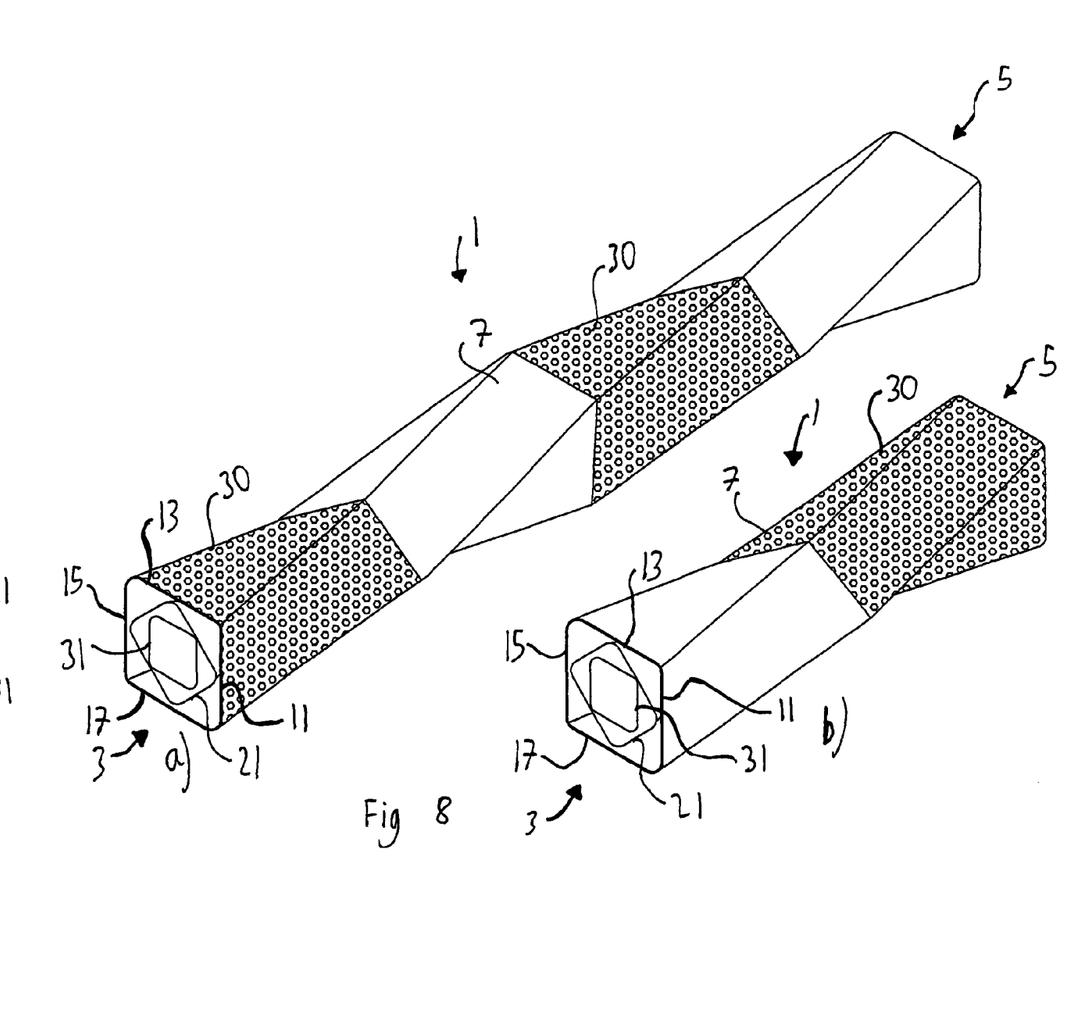
FIGS. 8a and 8b are perspective views of two different lengths of the fluid transfer pipe/fluid attenuator of FIG. 7.

Referring to FIGS. 7 and 8, the outer pipe 1 in this example comprises a plurality of longitudinally spaced apart perforated regions 30. The inner pipes 21, 23 may also be perforated in whole or in part, as required.

Figure 9:
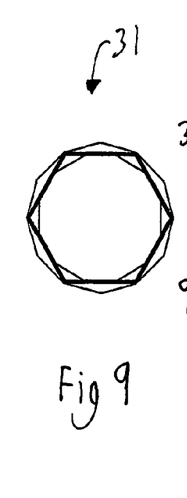
FIG. 9 is an end view of an additional fluid transfer pipe/fluid attenuator in accordance with the present invention.
Figure 10:
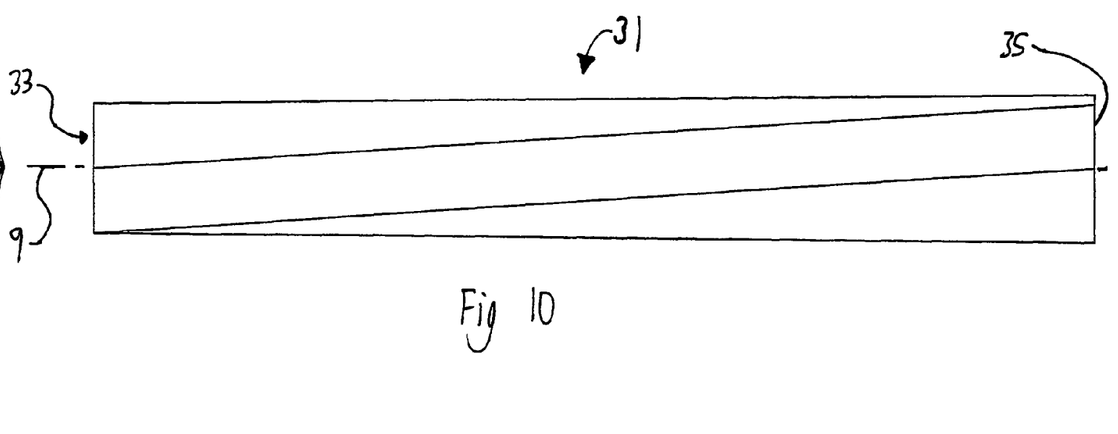
FIG. 10 is a side view of the fluid transfer pipe/fluid attenuator of FIG. 9.

Referring to FIGS. 9 and 10, another embodiment of a fluid transfer pipe/fluid attenuator 31 comprises opposed ends 33, 35 of hexagonal transverse cross section, having been twisted through 60° along its length.

Figure 11:
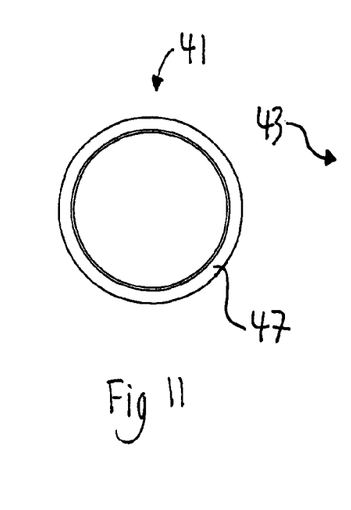
FIG. 11 is an end view of another fluid transfer pipe/fluid attenuator in accordance with the present invention.
Figure 12:
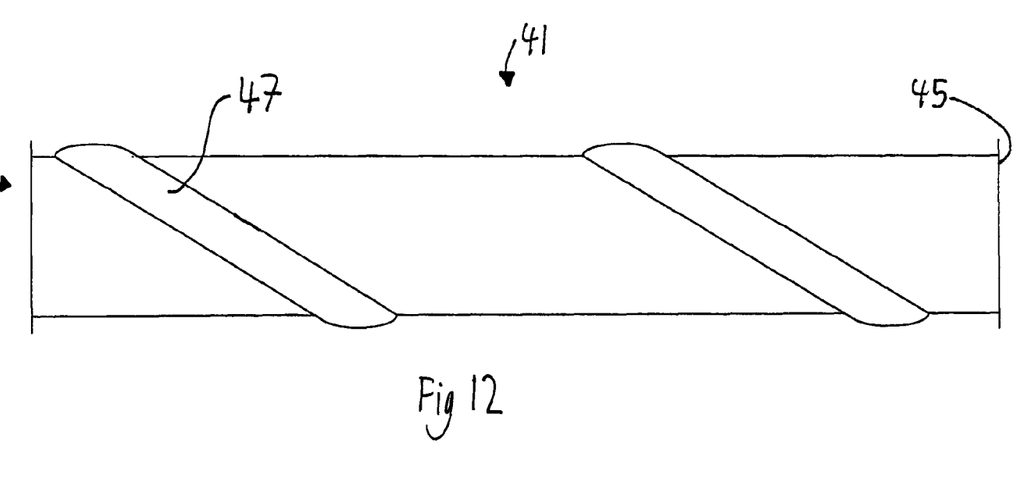
FIG. 12 is a side view of the fluid transfer pipe/fluid attenuator of FIG. 10.

Referring to FIGS. 11 and 12, another embodiment of a fluid transfer pipe/fluid attenuator 41 comprises opposed ends 43, 45 of circular transverse cross section. In this embodiment a channel 47 is formed in the wall of the fluid transfer pipe/fluid attenuator 41 that twists around the fluid transfer pipe/fluid attenuator 41 along its length. In this embodiment the spiral channel 47 varies the transverse cross section of the fluid transfer pipe/fluid attenuator 1 along the length of the fluid transfer pipe/fluid attenuator 41.

Figures 13, 14:
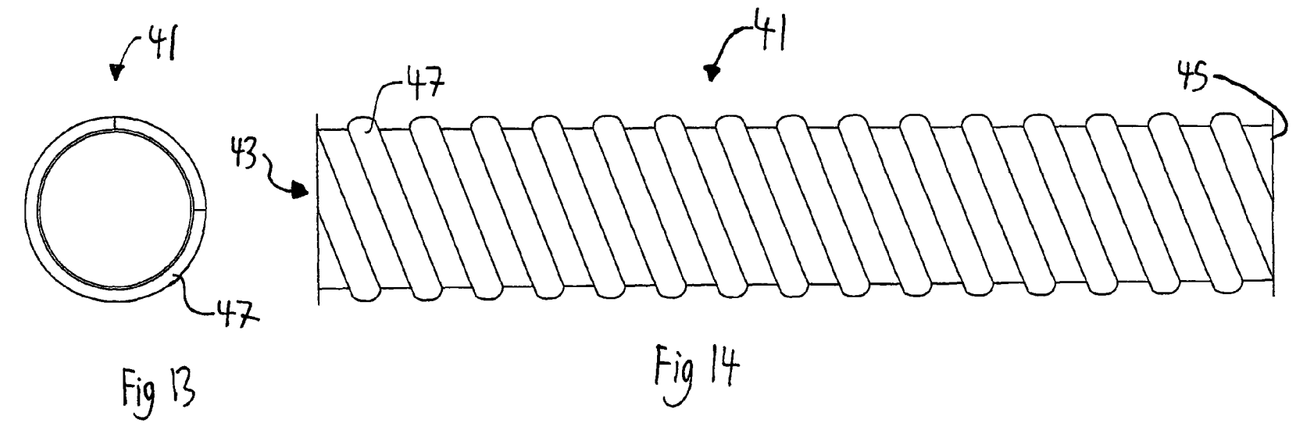
FIG. 13 is an end view of another fluid transfer pipe/fluid attenuator in accordance with the present invention.
FIG. 14 is a side view of the additional fluid transfer pipe/fluid attenuator of FIG. 13.

Referring to FIGS. 13 and 14, a modified embodiment of the fluid transfer pipe/fluid attenuator 41 comprises a channel 47 of greater pitch than the embodiment of FIGS. 11 and 12.

In use, the fluid transfer pipe 1, 31, 41 above can comprise part of pipework in a fluid transfer apparatus.

When fluid is pumped along, or drawn through, the fluid transfer pipe 41, it is thought that the varying transverse cross section of the pipe, that is the non linearity of the pipe cross section along its length, is such as to generate layers of fluid flow over the pipe cross section of differing flow velocities and pressures. The layers that flow over the non-linear pipe wall, which effectively comprises an irregular boundary, are of lower flow velocity/lower pressure and surround a core of higher flow velocity/higher pressure fluid. It is thought that the lower flow velocity outer layer forms a low friction liquid tube through which the higher flow velocity fluid core can flow at reduced friction levels and reduced drag. The higher flow velocity fluid core thus requires a pump motor of lower energy consumption than with previous apparatus.

The degree of variation in the transverse cross section can be altered to achieve the desired combination of fluid flow rate and energy consumption. For example, the angle of twist of the pipe 1, 31, 41 along its length can be varied, as can, the number of inner pipes provided, if any, and the angle of twist of those inner pipes, if any.

In use, the fluid attenuator 1, 31, 41 above can comprise part of a fluid attenuator apparatus, for example the fluid attenuator 1, 31, 41 may comprise a silencer for a vehicle or building exhaust apparatus.

When exhaust fluid flows along the fluid attenuator 1, 31, 41 it is thought that the fluid flow will stratify as described above such that there is a lower velocity outer fluid tube through which a core of higher velocity fluid flows. It is thought that the layers of fluid flow reduce the pressure differential between boundary and core fluid layers and between the pipe inlet and outlet such that the overall sound energy transferred is reduced.

The outer or inner pipes can be perforated as required to comprise a liner or inner for an attenuator to further absorb sound energy from the fluid flowing through the pipe(s).

Interactions between the shape of the external pipe and the sound power can be used to tune standing waves to cancel certain sound energies. The shapes can also be used to chamber multiple pipes, each with differing arrangements of sandwiched sound absorbent materials outside an inner perforated pipe. The chambered outer fluid pipe(s) and absorbent materials create differing rates of absorption and absorption/reaction sound reductions at different acoustic frequencies.

The varying shape of the boundary constraining the fluid flow is used to disturb the acoustic energy of the flowing fluid. The rate of twist of the pipe between its ends, and/or the pitch of any spiral channel formed in the pipe wall, can facilitate the acoustic attenuation by tuning the frequency of the absorption/reaction.

Multiple lengths of the pipe can be used together to form a composite pipe of the same or differing transverse cross sections and lengths.

It is envisaged that the pipes 1, 31, 41 can be used with any suitable fluid including gases or liquids as required.

The outer pipe 1, 31 41 and or one or all inner pipe(s) may be perforated as required.

Each end 3, 5 of the outer pipe 1, 31, 41 may comprise suitable pipe connections as required.

The invention claimed is:

1. A fluid transfer pipe comprising opposed ends adapted to be connected to respective pipework, the fluid transfer pipe comprising a longitudinal axis, the transverse cross section of the fluid transfer pipe varying along the length of the fluid transfer pipe such that the distance radially outwardly from the longitudinal axis to the inner wall of the fluid transfer pipe is non linear along at least part of the length of the fluid transfer pipe, wherein the fluid transfer pipe comprises multiple concentric pipes mounted together to form a composite pipe, the transverse cross section of at least one of the concentric pipes varying along the length of the composite pipe, wherein the concentric pipes define radially spaced transfer ducts around an inner pipe, and wherein one or more of the transfer ducts is filled with an insert of sound deadening material.

2. The fluid transfer pipe of claim 1 wherein the transverse cross section of the fluid transfer pipe is such as to in use when fluid is flowing or forced along fluid transfer pipe, induce layers of fluid of differing flow velocities/pressures, the radially outer layer being of lower flow velocity/pressure than a radially inner layer such that the radially outer layer functions as a liquid pipe through which the radially inner layer flows.

3. The fluid transfer pipe of claim 1 wherein the transverse cross section of pipe varies gradually along the length of the fluid transfer pipe.

4. The fluid transfer pipe of claim 3 wherein the fluid transfer pipe is twisted about its longitudinal axis such that the transverse cross section of the fluid transfer pipe varies along its length, that is the fluid transfer pipe appears as if one part of the fluid transfer pipe has been rotated about the longitudinal axis relative to another longitudinal spaced part of the fluid transfer pipe.

5. The fluid transfer pipe of claim 4 wherein the transverse cross section of the fluid transfer pipe is of spiral form.

6. The fluid transfer pipe of claim 3 wherein the pipe comprises two aligned opposed ends of substantially identical transverse cross section, and an intermediate portion of differing transverse cross section to the two ends.

7. The fluid transfer pipe of claim 6 wherein each opposed end of the fluid transfer pipe is of quadrilateral transverse cross section.

8. The fluid transfer pipe of claim 6 wherein each opposed end of the fluid transfer pipe is of curved transverse cross section, such as circular, oval or elliptical for example.

9. The fluid transfer pipe of claim 1 wherein the fluid transfer pipe is of substantially constant transverse cross section along its length and is formed with a formation or insert of varying transverse cross section.

10. The fluid transfer pipe of claim 1 wherein the transverse cross section of all of the concentric pipes varies along the length of the composite pipe.

11. The fluid transfer pipe of claim 1 wherein the transverse cross section of one concentric pipe varies in a contra direction to the transverse cross section of another concentric pipe.

12. The fluid transfer pipe of claim 1 wherein the fluid transfer pipe is perforated.

13. The fluid transfer pipe of claim 12 wherein the fluid transfer pipe is perforated along part of its length only.

14. The fluid transfer pipe of claim 1 wherein the sound deadening material is provided in a variable cross section cavity defined between adjacent concentric pipes.

15. The fluid transfer pipe of claim 1 wherein the fluid transfer pipe is provided with an acoustically reactive chamber operative to introduce a noise reducing resonance in the fluid passing through the chamber.

16. The fluid transfer pipe of claim 15 wherein the reactive chamber comprises a Helmholtz Resonator comprising a narrow fluid inlet leading to a larger fluid chamber.

17. A fluid transfer apparatus comprising a fluid transfer pipe according to claim 1.

18. A method of transferring fluid using a fluid transfer pipe according to claim 1.

19. A fluid attenuator comprising a pipe the opposed ends of which are adapted to be connected to respective pipework, the pipe comprising a longitudinal axis, the transverse cross section of the pipe varying along the length of the pipe such that the distance radially outwardly from the longitudinal axis to the inner wall of the pipe is non linear along at least part of the length of the pipe, wherein the pipe comprises multiple concentric pipes mounted together to form a composite pipe, the transverse cross section of at least one of the concentric pipes varying along the length of the composite pipe, wherein the concentric pipes define radially spaced transfer ducts around an inner pipe, and wherein one or more of the transfer ducts is filled with an insert of sound deadening material.

20. A fluid attenuator apparatus comprising a fluid inlet and a fluid outlet, a fluid attenuator in accordance with claim 19 being connected between the fluid inlet and the fluid outlet.

21. A method of attenuating sound generated by a flowing fluid using a fluid attenuator according to claim 19.

* * * * *